US012674714B2

(12) United States Patent　　　(10) Patent No.:　US 12,674,714 B2
Richarz et al.　　　(45) Date of Patent:　Jul. 7, 2026

(54) SYSTEMS AND METHODS FOR NON-INVASIVE DETERMINATION OF PROPERTIES OF PRESSURE VESSELS

(71) Applicants: KENWAVE SOLUTIONS INC., Mississauga (CA); VESI BOESMAN HOLDINGS INC., Thornhill (CA)

(72) Inventors: Werner G. Richarz, Mississauga (CA); Harrison F. Richarz, Markham (CA); Tuukka Vaelimaa, Espoo (FI)

(73) Assignees: KENWAVE SOLUTIONS INC., Mississauga (CA); VESI BOESMAN HOLDINGS INC., Thornhill (CA)

( * ) Notice: Subject to any disclaimer, the term of this patent is extended or adjusted under 35 U.S.C. 154(b) by 281 days.

(21) Appl. No.: 17/998,375

(22) PCT Filed: May 7, 2021

(86) PCT No.: PCT/IB2021/053916
§ 371 (c)(1),
(2) Date: Nov. 10, 2022

(87) PCT Pub. No.: WO2021/229393
PCT Pub. Date: Nov. 18, 2021

(65) Prior Publication Data
US 2023/0175909 A1　Jun. 8, 2023

Related U.S. Application Data

(60) Provisional application No. 63/023,017, filed on May 11, 2020.

(51) Int. Cl.
　G01L 11/04　　　(2006.01)
　F17D 5/06　　　(2006.01)
　　　(Continued)

(52) U.S. Cl.
　CPC ..........　*G01L 11/04* (2013.01); *G01L 19/0084* (2013.01); *G01L 19/04* (2013.01);
　　　(Continued)

(58) Field of Classification Search
　CPC ........... G01L 2019/0053; G01L 27/002; G01L 19/08; G01L 19/0672; G01L 19/04;
　　　(Continued)

(56) References Cited

U.S. PATENT DOCUMENTS 4,262,343 A * 4/1981 Claycomb ............... E21B 47/18
　　　　　　　　　　　　　　　　175/48
6,000,288 A * 12/1999 Kwun ................... G01N 29/449
　　　　　　　　　　　　　　　　73/602

(Continued)

FOREIGN PATENT DOCUMENTS

CN　　　101050702 A　* 10/2007
DE　　202013012302 U1　2/2016
　　　(Continued)

OTHER PUBLICATIONS

Translation FR_2910963 (Year: 2008).*

(Continued)

*Primary Examiner* — Peter J Macchiarolo
*Assistant Examiner* — Monica S Young
(74) *Attorney, Agent, or Firm* — Perry + Currier Inc.

(57)　　　ABSTRACT

An example system for non-invasive determination of target properties of a pressure vessel includes: a signal generator acoustically coupled to a fluid contained in the pressure vessel and disposed externally to the pressure vessel, the signal generator to emit acoustic signals into the fluid; a plurality of sensors acoustically coupled to the fluid and disposed externally to the pressure vessel to detect the acoustic signals; a control device interconnected with the signal generator and the plurality of sensors, the control (Continued)

device configured to: control the signal generator to emit acoustic signals into the pressure vessel; obtain sensor data from the plurality of sensors, the sensor data representing the acoustic signals as received by the plurality of sensors; compute, based on the detected signal data, the target properties of the pressure vessel; and output an indication of the target properties.

12 Claims, 7 Drawing Sheets

(51) Int. Cl.

| | |
|---|---|
| G01B 17/02 | (2006.01) |
| G01L 19/00 | (2006.01) |
| G01L 19/04 | (2006.01) |
| G01L 19/06 | (2006.01) |
| G01L 19/08 | (2006.01) |
| G01L 27/00 | (2006.01) |
| G01N 29/07 | (2006.01) |
| G01N 29/11 | (2006.01) |
| G01N 29/14 | (2006.01) |
| G01N 29/34 | (2006.01) |
| G01N 29/44 | (2006.01) |
| G01N 29/46 | (2006.01) |
| G01N 29/48 | (2006.01) |

(52) U.S. Cl.
CPC .......... *G01L 19/0672* (2013.01); *G01L 19/08* (2013.01); *G01L 27/002* (2013.01); *G01N 29/07* (2013.01); *G01N 29/11* (2013.01); *G01N 29/14* (2013.01); *G01N 29/34* (2013.01); *G01N 29/4409* (2013.01); *G01N 29/4463* (2013.01); *G01N 29/46* (2013.01); *G01N 29/48* (2013.01); *F17D 5/06* (2013.01); *G01B 17/02* (2013.01); *G01L 2019/0053* (2013.01); *G01N 2291/0289* (2013.01); *G01N 2291/103* (2013.01); *G01N 2291/2634* (2013.01); *Y02E 30/30* (2013.01)

(58) Field of Classification Search
CPC ..... G01L 19/0084; G01L 11/04; G01N 29/07; G01N 29/11; G01N 29/14; G01N 29/34; G01N 29/4409; G01N 29/4463; G01N 29/46; G01N 29/48; G01N 2291/02854; G01N 2291/0289; G01N 2291/103; G01N 2291/2634; G01N 2291/2695; G01N 29/043; Y02E 30/30; G01B 17/02; G01B 21/042; F17D 5/06
USPC ........................................................ 73/1.57
See application file for complete search history.

(56) References Cited

U.S. PATENT DOCUMENTS

| | | | | |
|---|---|---|---|---|
| 6,460,402 | B1 * | 10/2002 | Gomm | G01N 29/40 |
| | | | | 73/24.01 |
| 6,561,032 | B1 * | 5/2003 | Hunaidi | G01N 29/07 |
| | | | | 702/171 |
| 6,568,271 | B2 | 5/2003 | Shah et al. | |
| 7,266,992 | B2 | 9/2007 | Shamout et al. | |
| 7,328,618 | B2 | 2/2008 | Hunaidi et al. | |
| 9,097,601 | B2 | 8/2015 | Stephens et al. | |
| 9,291,520 | B2 | 3/2016 | Fleury, Jr. et al. | |
| 9,835,592 | B2 | 12/2017 | Yusuf et al. | |
| 10,175,135 | B2 | 1/2019 | Dintakurt et al. | |
| 10,267,774 | B2 | 4/2019 | Yusuf et al. | |
| 10,401,254 | B2 | 9/2019 | Giunta et al. | |
| 10,509,012 | B2 | 12/2019 | Perrier | |
| 10,539,480 | B2 * | 1/2020 | Burtea | G01B 17/00 |
| 10,690,630 | B2 | 6/2020 | Perrier et al. | |
| 10,768,146 | B1 * | 9/2020 | Burtea | G01N 29/032 |
| 10,851,947 | B2 * | 12/2020 | Gong | G01M 5/0033 |
| 11,012,763 | B2 | 5/2021 | Solomon et al. | |
| 11,060,668 | B2 * | 7/2021 | Simpson | G01L 15/00 |
| 11,162,866 | B2 * | 11/2021 | Gong | G01M 3/243 |
| 2003/0001439 | A1 * | 1/2003 | Schur | G21D 7/02 |
| | | | | 310/11 |
| 2003/0033870 | A1 * | 2/2003 | Shah | G01N 29/449 |
| | | | | 73/299 |
| 2008/0208505 | A1 | 8/2008 | Amir et al. | |
| 2009/0078049 | A1 * | 3/2009 | Sinha | G01N 29/28 |
| | | | | 73/623 |
| 2012/0055239 | A1 * | 3/2012 | Sinha | G01F 25/10 |
| | | | | 73/61.79 |
| 2012/0055253 | A1 * | 3/2012 | Sinha | G01N 29/222 |
| | | | | 73/622 |
| 2015/0233710 | A1 * | 8/2015 | Simonetti | G01B 17/02 |
| | | | | 73/633 |
| 2016/0097746 | A1 | 4/2016 | Traub | |
| 2016/0370325 | A1 * | 12/2016 | Yusuf | G01N 29/223 |
| 2017/0032795 | A1 * | 2/2017 | Burtea | G10L 19/018 |
| 2018/0136173 | A1 | 5/2018 | Takahashi et al. | |
| 2018/0292292 | A1 | 10/2018 | Takahashi et al. | |
| 2019/0128766 | A1 | 5/2019 | Burtea et al. | |
| 2019/0242851 | A1 * | 8/2019 | Sinha | G01N 29/024 |
| 2019/0390990 | A1 | 12/2019 | Krywyj et al. | |
| 2021/0310802 | A1 * | 10/2021 | Pedersen | G01B 17/02 |
| 2021/0341350 | A1 * | 11/2021 | Peyerl | G01M 3/243 |
| 2022/0026395 | A1 | 1/2022 | Burtea et al. | |
| 2022/0163420 | A1 | 5/2022 | Stephens et al. | |
| 2022/0205357 | A1 | 6/2022 | Robertson et al. | |
| 2022/0276213 | A1 | 9/2022 | Perrier et al. | |
| 2023/0017820 | A1 | 1/2023 | Burtea et al. | |
| 2023/0091331 | A1 | 3/2023 | Gibson et al. | |

FOREIGN PATENT DOCUMENTS

| | | | | | |
|---|---|---|---|---|---|
| FR | 2910963 | A1 * | 7/2008 | ............. | G01L 21/10 |
| JP | 2002236115 | A | 8/2002 | | |
| JP | 2009503492 | A | 1/2009 | | |
| JP | 2015055559 | A | 3/2015 | | |
| JP | 2015083979 | A | 4/2015 | | |
| JP | 2016089339 | A | 5/2016 | | |
| JP | 6355095 | B1 | 7/2018 | | |
| JP | 6829534 | B1 | 2/2021 | | |
| JP | 6856169 | B2 | 4/2021 | | |
| JP | 2021148519 | A | 9/2021 | | |
| KR | 20180079128 | A | 7/2018 | | |
| WO | WO-2010017599 | A1 * | 2/2010 | ............... | F17D 5/06 |
| WO | WO-2017019678 | A1 | 2/2017 | | |
| WO | WO-2017177150 | A1 * | 10/2017 | .......... | G01N 29/348 |
| WO | WO-2023066594 | A1 * | 4/2023 | ............. | G01F 1/66 |

OTHER PUBLICATIONS

Smart City Sweden, "Arne Jensen AB: Swedish Companies." smartcitysweden.com, Apr. 24, 2020, downloaded from the Internet at URL: https://smartcitysweden.com/companies/1926/arne-jensen-ab/.
EPULSE."ePulse Pipeline Condition Assessment—Echologics", echologics.com, 2020, downloaded from the Internet at URL: https://www.echologics.com/services/condition-assessment/epulse/.
Aquam Pipe Diagnostics, "LDS1000™," aquampd.com, 2020, dowloaded from the Internet on May 25, 2020 at URL: https://aquampd.com/solutions/technology/lds1000/.
Hydromax USA, "P-CAT Pipeline Condition Assessment Technology", hydromaxusa.com, date: unknown.
Abdullahi, Mustapha, "Detection of Leakage and Blockage in Pipeline Systems". The University of Manchester (United Kingdom), 2019.
Breivoll, "Acoustic Resonance Technology", breivoll.eu, date unknown, Retrieved from the Internet on Apr. 11, 2023 from URL: https://breivoll.eu/diagnostics/art-technology/.

(56) References Cited

OTHER PUBLICATIONS

Iconac, "Tonal Pipe Assessment FAQ", iconac.co, Aug. 24, 2018, Retrieved from the Internet on Apr. 11, 2023 from URL: http://www.iconac.co/index.php/2018/08/24/tonal-pipe-assessment-faq/.

PICA, "Focus On: The PICA, HydraSnake", picacorp.com, Feb. 19, 2019, Retrieved from the Internet on Apr. 11, 2023 from URL: https://www.picacorp.com/Technology/Inspection-Technology/ArtMID/932/ArticleID/219/Focus-On-The-PICA-HydraSnake.

XPRT Environmental, "Acoustic Sensing Technology (UK) Ltd.—Sewerbatt—Inspection System", date unknown, environmental-expert.com, Retrieved from the Inernet on Apr. 11, 2023 from URL: https://www.environmental-expert.com/products/sewerbatt-inspection-system-389003.

Wang, Wenjie, et al. "Estimating acoustic wave dispersion in water pipelines using a single spatial measurement." The Journal of the Acoustical Society of America 147.5 (2020): EL415-EL420.

Li, Zhao, et al. "Guided acoustic wave interaction with flanged junctions in water-filled steel pipelines." The Journal of the Acoustical Society of America 144.5 (2018): 2824-2837.

Li, Zhao et al., "Propagation of monopole source excited acoustic waves in a cylindrical high-density polyethylene pipeline." The Journal of the Acoustical Society of America 142.6 (2017): 3564-3579.

Dubey, Amartansh, et al. "Measurement and characterization of acoustic noise in water pipeline channels." IEEE Access 7 (2019): 56890-56903.

Li, Zhao, et al. "The influence of pipeline thickness and radius on guided wave attenuation in water-filled steel pipelines: Theoretical analysis and experimental measurement." The Journal of the Acoustical Society of America 145.1 (2019): 361-371.

Xylem, PipeDiver—Xylem.com, 2022, Retrieved from the Internet on Sep. 19, 2023 from URL: www.xylem.com/siteassets/brand/pure-technologies/resources/brochure/puretech-pipediver.pdf.

* cited by examiner

SYSTEMS AND METHODS FOR NON-INVASIVE DETERMINATION OF PROPERTIES OF PRESSURE VESSELS

CROSS REFERENCE TO RELATED APPLICATIONS

This application claims priority to U.S. Provisional Application No. 63/023,017, filed May 11, 2020, the entirety of which is incorporated herein by reference.

FIELD

The specification relates generally to pressure vessel technologies, and more particularly to systems and methods for non-invasive determination of properties of pressure vessels.

BACKGROUND

Over the life of a pressure vessel, such as a pipe, it may be desirable to determine properties, such as wall thickness, to monitor the integrity of the pressure vessel prior to incidences of leakage or bursting. Present methods determining such properties may affect the integrity of the pressure vessel in order to perform the tests, or are invasive and require access to the interior of the pressure vessel, possibly even requiring that the pressure vessel be taken out of commission for the test. This may be inconvenient or dangerous, for example when the temperature or chemical composition of the fluid in the pressure vessel is hazardous to human health, the environment, the surrounding infrastructure, or other nearby equipment.

SUMMARY

According to an aspect of the present specification, a system for non-invasive determination of target properties of a pressure vessel is provided. The system includes: a signal generator acoustically coupled to a fluid contained in the pressure vessel and disposed externally to the pressure vessel, the signal generator to emit acoustic signals into the pressure vessel; a plurality of sensors acoustically coupled to the fluid and disposed externally to the pressure vessel to detect the acoustic signals; a control device interconnected with the signal generator and the plurality of sensors, the computing device configured to: control the signal generator to emit acoustic signals into the pressure vessel; obtain sensor data from the plurality of sensors, the sensor data representing the acoustic signals as received by the plurality of sensors; compute, based on the detected signal data, the target properties of the pressure vessel; and output an indication of the target properties.

According to another aspect of the present specification, a non-invasive method for determining target properties of a pressure vessel is provided. The method includes: controlling a signal generator to emit acoustic signals into a fluid contained in the pressure vessel from externally to the pressure vessel; obtaining sensor data representing the acoustic signals as transmitted through the pressure vessel, the sensor data obtained externally to the pressure vessel; computing, based on the sensor data, the target properties of the pressure vessel; and outputting an indication of the target properties.

BRIEF DESCRIPTION OF DRAWINGS

Implementations are described with reference to the following figures, in which.

DETAILED DESCRIPTION

Pressure vessels need to be monitored and evaluated over their lifetime. This may include the calculation of the average values of several physical attributes of the inner carrier/shell of a pressure vessel filled with fluid, which for reasons of temperature or chemical composition may be hazardous to human health, the environment, the surrounding infrastructure, or other nearby equipment.

Current methods may be invasive and may require introduction of instruments into the interior of the pressure vessel, potentially allowing harmful contents to escape the pressure vessel, or imparting potentially harmful pressure transients or strains to the vessel or fluid therein. Such methods may also require the evacuation of fluid prior to testing. Current non-invasive methods lack the granular resolution required for effective repair and many systems are not compatible with vessels whose wall construction consists of multiple layers.

According the present specification, a system is provided for non-invasive determination of properties of a pressure vessel. The system employs a signal generator to introduce controlled acoustic signals. The system selects, calibrates and tunes the signals emitted in real-time based on sensor data received at sensors downstream from the signal generator. Properties of the pressure vessel, such as wall thickness and fault locations, may be determined based on the acoustic signals emitted by the signal generator and the corresponding signals received at the downstream sensors. Further, the determination of the properties may be verified based on two or more parallel computations which are subsequently compared. The present system provides accurate fault detection and is non-invasive as the components are located at an external surface of the pressure vessel. The pressure vessels may thus continue to be utilized during testing.

Figure 1:
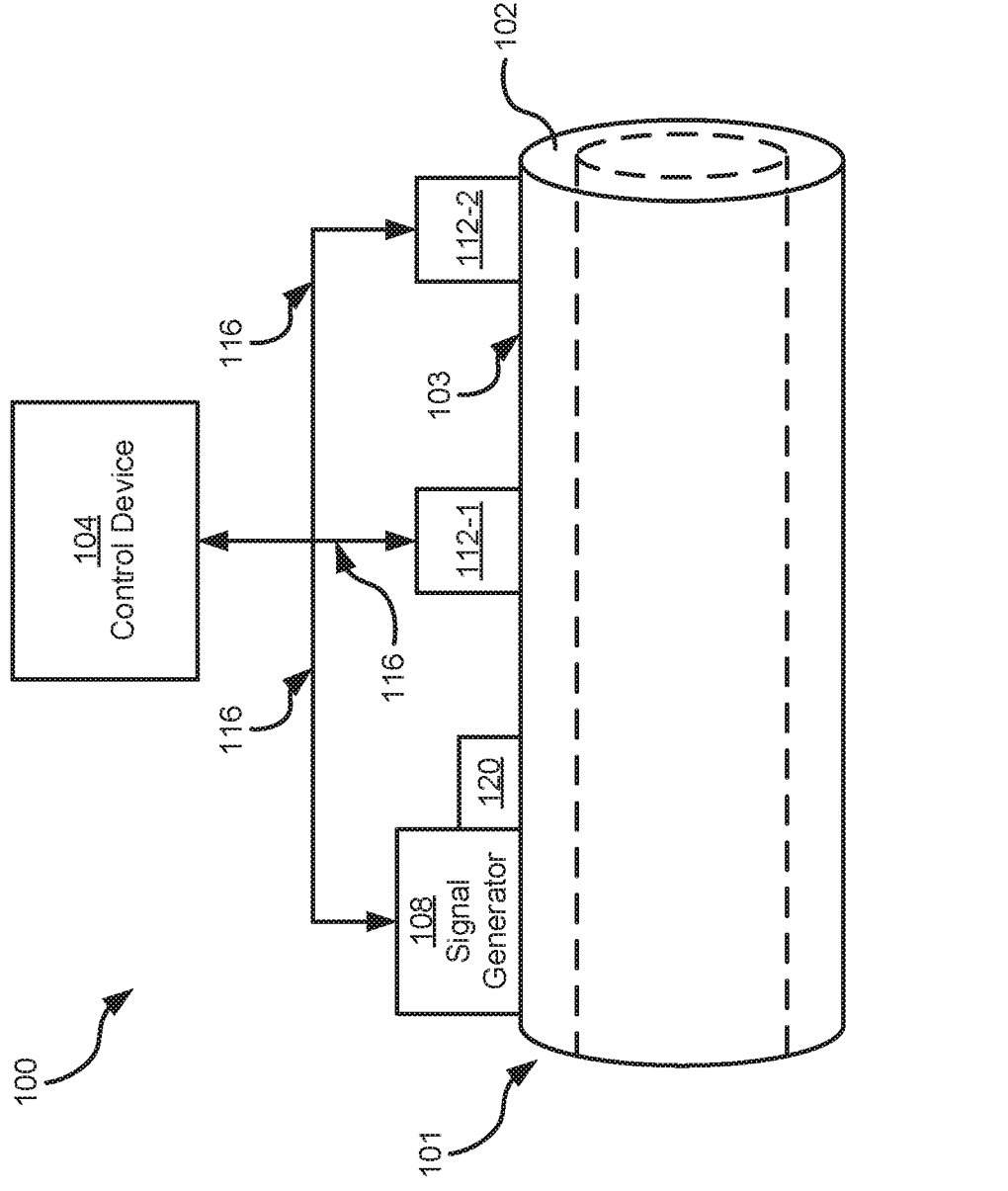
FIG. 1 depicts a block diagram of an example system for non-invasive determination of properties of pressure vessels.

FIG. 1 depicts an example system 100 for non-invasive determination of target properties of a pressure vessel 101. The system 100 includes a control device 104. The system 100 further includes a signal generator 108 and a plurality of sensors 112-1, 112-2 (referred to herein collectively as sensors 112 and generically as a sensor 112) interconnected with the control device 104 via communication links 116.

The system 100 is deployed to determine properties of the pressure vessel 101. For example, the pressure vessel 101 may be a pipe defined by a wall 102 enclosing a fluid. The system 100 may determine properties of the wall 102, such as a thickness of the wall at various points along the wall, locations of any cracks or faults of the wall 102, and the like. More particularly, the system 100 is configured to determine properties of the pressure vessel 101 using non-invasive methods. Accordingly, the signal generator 108 and the sensors 112 may be deployed at an external surface 103 of the wall 102 to generate and detect signals for the property determination operations, as will be described further below. The system 100 may thus be employed on in-use pressure vessels without destroying or otherwise affecting the integrity of the pressure vessel.

The control device 104 is generally configured to control the system 100 and execute the property determination operations. The computing device may be a special purpose computing device for the control and property determination operations. In other examples, the control device 104 may be a computing device such as a desktop computer, a laptop computer, a server, a kiosk, or other suitable device configured for the control and property determination operations. In further examples, the control device 104 may be a mobile computing device, such as a tablet, smart phone, or the like configured for the control and property determination operations.

The control device 104 may be in communication with other computing devices (not shown), such as servers, desktop computers, laptop computers, mobile devices, or other suitable devices. In particular, the communication links to the other computing devices may be wired or wireless, or a combination of wired and wireless including direct links, or links that traverse one or more networks. For example, the communication links may utilize networks including any one of, or any combination of, a local area network (LAN) defined by one or more routers, switches, wireless access points or the like, any suitable wide area networks (WAN) including cellular networks and the internet, and the like.

The signal generator 108 is acoustically coupled to a fluid contained within the pressure vessel 101. The signal generator 108 is disposed externally to the pressure vessel 101, such as at the external surface 103 of the wall 102. In other examples, the signal generator 108 may be disposed at other external locations, such as attached to fittings of the vessel, at flanges or valves, for example. Accordingly, the signal generator 108 may include one or more additional acoustically transparent membranes configured to act as physical barriers between any fluid in the valve or flange and the sound source in the signal generator 108 to prevent emission of harmful materials from within the pressure vessel 101. The signal generator 108 is configured to emit acoustic signals into the pressure vessel 101, and more particularly into the fluid contained in the pressure vessel 101. That is, the signal generator 108 may include a sound source, such as a hydrophone, a sonar transducer, an electro-dynamic shaker, a modal hammer, or the like. Further, the signal generator 108 is controllable (i.e., by the control device 104) to emit acoustic signals at different frequencies.

The sensors 112 are also acoustically coupled to the fluid and disposed externally to the pressure vessel 101 to detect acoustic signals. For example, the sensors 112 may include accelerometers, temperature sensors, pressure sensors, displacement sensors, combinations of the above, and the like. The sensors 112 may be disposed, for example, at the external surface 103. In other examples, the sensors 112 may be hydrophones or the like located at valves or other designated openings of the pressure vessel 101. Specifically, the sensors 112 are configured to detect the acoustic signals emitted by the signal generator 108, as transmitted and reflected through the pressure vessel 101. In the present example, the system 100 includes two sensors 112; in other examples, the system 100 may include more than two sensors 112.

In some examples, at least one of the sensors 112 may be integrated with the signal generator 108 as a reference sensor to allow the system 100 to verify that the signal output at the signal generator 108 is as desired. That is, the integrated reference sensor is configured to detect the acoustic signal as emitted by the signal generator.

The signal generator 108 and the sensors 112 are in communication with the control device 104 via communication links 116. The communication links 116 may be wired or wireless, or a combination of wired and wireless, including direct links. For example, the communication links 116 may include universal serial bus (USB) wired connections, wireless communications, such as Bluetooth, other suitable short-range wireless communications protocols, or Wi-Fi, or the like. Accordingly, the signal generator 108 and the sensors 112 include suitable hardware (e.g., transmitters, receivers, and the like) to allow the signal generator and the sensors 112 to communicate with the control device 104. The specific components are selected based on the type of communications links 116 that the signal generator 108 and the sensors 112 communicate over.

In some examples, the system may further include an integral thermodilatohydrometer 120 configured to determine dissolved gas parameters of the fluid contained within the pressure vessel 101. The thermodilatohydrometer 120 may be for non-homogeneous aqueous mixtures or other fluids. In the present example, the thermodilatohydrometer is incorporated with the signal generator 108. In other examples, the thermodilatohydrometer maybe incorporated with one of the sensors 112. In particular, the dissolved gas parameters obtained from the thermodilatohydrometer 120 may be used by the control device 104 to correct for the presence of dissolved gases and bubbles in the fluid contained in the pressure vessel 101.

Each of the signal generator 108 and the sensors 112 may further include temperature control components coupled thereto to maintain suitable respective operating temperatures for the signal generator 108 and the sensors 112. This may be particularly applicable when, for example, the pressure vessel 101 contains a high temperature fluid. For example, the temperature control components may include a cooling system including a coolant reservoir, a recirculating pump, tubing connected to the sensor/signal generator casing, and a microcontroller. The microcontroller may monitor the temperature via a temperature sensor, and control the pump to circulate the coolant when the temperature is above a first threshold temperature. Further, if the temperature continues to rise above a second threshold temperature, the microcontroller may be configured to alert an operator (e.g., via a notification to a mobile device or similar) and shut down the sensor 112 or signal generator 108. In other examples, the temperature control components may include a heating system, fans, radiators, evaporative cooling systems, vapor chambers, thermoelectric Peltier chips, and the like. Further, in other examples, the temperature control components may alert an operator and shut down the sensor 112 or signal generator 108 in the event the temperature drops below a threshold temperature. In particular, by shutting down the signal generator 108 or the sensor 112, the internal components and functioning of the device may be preserved if the environment gets too hot or too cold.

Figure 2:
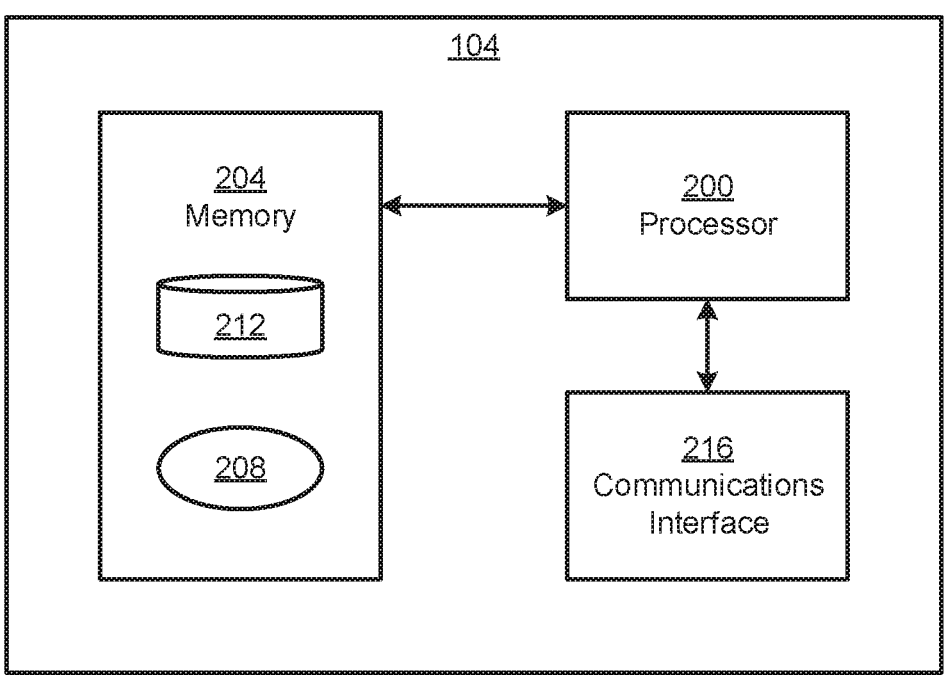
FIG. 2 depicts certain internal components of a control device in the system of FIG. 1.

Referring to FIG. 2, the control device 104, including certain internal components, is shown in greater detail. The device 104 includes a processor 200, such as a central processing unit (CPU), a microcontroller, a processing core, or similar. The processor 200 may include multiple cooperating processors. In some examples, the functionality implemented by the processor 200 may be implemented by one or more specially designed hardware and firmware components, such as a field-programmable gate array (FPGA), an application-specific integrated circuit (ASIC) and the like. In some examples, the processor 200 may be a special purpose processor which may be implemented via dedicated logic circuitry of an ASIC, an FPGA, or the like in order to enhance the processing speed of the property determination operation discussed herein.

The processor 200 is interconnected with a non-transitory computer-readable storage medium, such as a memory 204. The memory 204 may include a combination of volatile memory (e.g., random access memory or RAM) and non-volatile memory (e.g., read only memory or ROM, electrically erasable programmable read only memory or EEPROM, flash memory). The processor 200 and the memory 204 may comprise one or more integrated circuits. Some or all of the memory 204 may be integrated with the processor 200. The memory 204 stores computer-readable instructions for execution by the processor 200. In particular, the memory 204 stores a control application 208 which, when executed by the processor 200, configures the processor 200 to perform various functions discussed below in greater detail and related to the property determination operation of the system 100. The application 208 may also be implemented as a suite of distinct applications.

The memory 204 may also store a repository 212 containing, for example, rules for use in the property determination operation (e.g., related to the acoustic signals to be emitted, for verifying consistency of computations, or the like), predefined parameters (e.g., parameters of the pressure vessel 101, the fluid contained therein, including manufacturing specifications, and the like), as well as previously computed target properties. In other examples, the memory 204 and/or the repository 212 may also store other rules and data pertaining to the property determination operation of the system 100.

The device 104 also includes a communications interface 216 interconnected with the processor 200. The communications interface 216 includes suitable hardware (e.g., transmitters, receivers, network interface controllers and the like) allowing the control device 104 to communicate with other computing devices, and with the signal generator 108 and the sensors 112. The specific components of the communications interface 216 are selected based on the type of network or other links, including the communication links 116 that the control device 104 is to communicate over.

In some examples, the device 104 may also include one or more input and/or output devices (not shown), interconnected with the processor 200. The input devices can include one or more buttons, keypads, touch-sensitive display screens or the like for receiving input from an operator, for example, to initiate the property determination operation. The output devices can include one or more display screens, sound generators, vibrators or the like for providing output or feedback to an operator, for example to output the determined target properties of the pressure vessel 101.

Figure 3:
FIG. 3 depicts a method for non-invasive determination of properties of pressure vessels in the system of FIG. 1.
Figure 3:
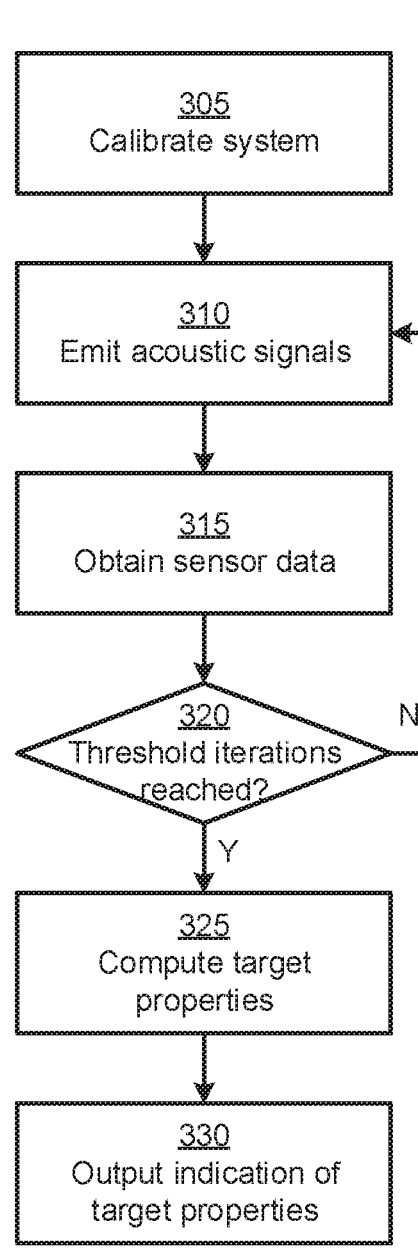

The operation of the system 100, as implemented via execution of the application 208 by the processor 200 will now be described in greater detail, with reference to FIG. 3. FIG. 3 illustrates a method 300 of determining properties of a pressure vessel, which will be described in conjunction with its performance in the system 100, and in particular by the device 104, with reference to the components illustrated in FIGS. 1 and 2. In other examples, the method 300 may be performed by other suitable computing devices or in other suitable systems.

The method 300 begins at block 305, for example, in response to an initiation signal, such as an input at an input device of the device 104. For example, an operator may activate a button to initiate the method 300. In other examples, the method 300 may be initiated automatically at predetermined intervals (e.g., on a schedule every 2 hours, every 6 hours, once per day, once per week, or other suitable intervals). At block 305, the device 104 is configured to calibrate the system 100. For example, the device 104 may obtain predefined parameters of the pressure vessel 101 and a fluid contained therein, as well as the defined spatial arrangement of the signal generator 108 and the sensors 112. Further, the device 104 may calibrate the readings from the sensors 112. For example, the device 104 may obtain sensor data from the sensors 112 in the absence of any induced signal by the signal generator to obtain a baseline of background noise detected by the sensors 112.

Further, the device 104 may be configured to calibrate the gain of the sensors 112. Specifically, the device 104 may calibrate the signal generator 108 and the sensors 112 based on test signals emitted by the signal generator 108 and test signal data obtained from the sensors 112. For example, the device 104 may compute initial spectral pulse parameters based on predefined parameters of the pressure vessel 101 and the fluid contained therein. The predefined parameters may include expected approximate thicknesses of the wall 102 of the pressure vessel 101, the ideal speed of sound in the fluid, and other relevant parameters which may affect signal propagation in the pressure vessel. The initial spectral pulse parameters may thus define a frequency, duration and amplitude of the test signals according to the predefined parameters and a desired gain at the sensors 112. The computation of the initial spectral pulse parameters may reduce the number of iterations required to obtain sufficient signal gain at the sensors 112.

The control device 104 may then control the signal generator 108 to emit test signals according to the initial spectral pulse parameters and obtain test signal data from the sensors 112. The device 104 may be configured to adjust the test signals to obtain sufficiently clear sensor data at each of the sensors 112 in order to obtain meaningful data. Thus, the control device 104 may adjust the strength of the test signals emitted by the signal generator based on the test signal data and according to a target received signal strength. For example, the device 104 may determine whether an average amplitude of test signal data exceeds a threshold amplitude, representing the target received signal strength. Further, the device 104 may define the amplitude of the test signal data based on the baseline data detected by the sensors 112. If the determination is negative, the device 104 may control the signal generator 108 to iteratively emit test signals (e.g., with increased amplitudes) to calibrate the system 100.

In some examples, at block 305, the control device 104 may additionally compare the signal as detected at an integrated reference sensor of the signal generator 108 to the input signal to verify that the output signal generally matches a desired output. The control device 104 may adjust the signal output by the signal generator 108 based on the comparison to ensure that the signal output by the signal generator 108 has the desired amplitude and other properties.

At block 310, the device 104 controls the signal generator 108 to emit acoustic signals into the pressure vessel 101. In particular, the control device 104 may select a particular frequency and duration at which the signal generator 108 is to emit the acoustic signals. The frequency and duration of the acoustic signals may be selected according to a pre-defined program (e.g., stored in the memory 204) or may be dynamically selected based on the calibration results and previously emitted and detected acoustic signals. For example, the frequency and duration may be selected based on one or more of: the material of the pressure vessel 101, the diameter of the pressure vessel 101, the type of fluid contained in the pressure vessel 101, the fluid temperature, the fluid pressure, and support structures of the pressure vessel 101. For example, the device 104 may control the frequency, duration, and power of the emitted acoustic signals to optimize the signals received at the sensors 112. The acoustic signals may be emitted at frequencies in the range of 1 to 20,000 Hz. In some examples, the acoustic signals may be emitted at higher frequencies.

The emitted acoustic signals may be emitted, for example, in pulses, tones, other shapes, and at different frequencies. The acoustic signals may be, for example, consecutive or alternating non-impulsive spectra and shaped pulses. More generally, the acoustic signals emitted are deterministic and repetitive to allow for consistency in determining the target properties based on the detected signals.

In particular, the acoustic signals may be emitted in pulses and at frequencies optimized for detection and recognition at the sensors 112. Preferably, the acoustic signals emitted by the signal generator 108 are periodic, with a period greater than the expected transit time between two sensors 112 located at a predetermined distance along the pressure vessel 101. Furthermore, the acoustic signals emitted by the signal generator 108 may include an identifiable start, such as a sudden and significant change in amplitude (e.g., measured by at least a threshold amplitude change).

Further, the periodic acoustic signal may preferably include at least two timescales: a period with a duration 2T and a signal window with a duration $2\tau$, where T is greater than $\tau$. In such examples, the signal at time t, represented by s(t) may be defined as follows:

$$s(t) = 0 \text{ when } -T \leq t \leq -\tau$$

$$s(t) = f(t) \text{ when } -\tau < t < \tau$$

$$s(t) = 0 \text{ when } \tau < t < T$$

Thus, the periodic acoustic signal may include time when no signal is sent in order to clearly differentiate one pulse from the next. The function $f(t)$ may define the acoustic signal, beginning for example with a sudden and significant change in amplitude.

Such a signal may be described, in some examples, in terms of a Fourier series, namely a collection of tones with appropriate amplitudes and phases that, when added together, are indistinguishable from the desired signal. For example, the Fourier series may be defined by Equation (1)

$$s(t) = \frac{a_0}{2} + \sum_{n=1}^{\infty} a_n \cos\frac{n\pi t}{T} + b_n \sin\frac{n\pi t}{T} \tag{1}$$

In Equation (1), s(t) represents the signal, an and bn represent nth coefficients in the Fourier series, defined as follows by equations (2) and (3):

$$a_n = \frac{1}{T} \int_{-\tau}^{\tau} f(t) \cos\frac{n\pi t}{T} dt \tag{2}$$

$$b_n = \frac{1}{T} \int_{-\tau}^{\tau} f(t) \sin\frac{n\pi t}{T} dt \tag{3}$$

The constant $$\frac{a_0}{2}$$

approaches 0 as the desired signal is proportional to the rate of change of the source strength, that is, $s(t) \propto dm(t)/dt$, where:

$$m(t) = \frac{T}{\pi} \sum_{n=1}^{\infty} \frac{a_n}{n} \cos\frac{n\pi t}{T} + \frac{b_n}{n} \sin\frac{n\pi t}{T} \tag{4}$$

The function m(t) defined in equation (4) may therefore define the modulation to be applied to generate the waveform s(t). In a practical application, the summation may not extend over an infinite number of terms, and may be truncated after N terms. Truncating the sum after N terms alters the appearance of the resulting waveform s(t), in accordance with the Gibbs phenomenon. Application of weighting terms, such as Lanczos smoothing, can be used to diminish these effects.

For example, the generation of a pressure impulse with a short rise-time requires that mechanical components of the source possess relatively little inertia. This constraint can be relaxed when the methodology of detection is based on observing propagation speeds of distinct tones. Frequencies and amplitudes of the Fourier series components can be selected to control the interval between tones as well as their amplitudes.

For example, the time sequence defined in equation (5) is equivalent to a time series sampled at intervals of $\Delta t$ seconds.

$$s_j = \sum_{n=0,step\, M}^{N_{max}} \frac{(-1)^n (nN)^2}{\left[(N-n)^2 + AnN\right]^2} \cos\frac{n\pi j\Delta t}{T} \tag{5}$$

The coefficients $$\frac{(nN)^2}{\left[(N-n)^2 + AnN\right]^2}$$

of equation (5) can be interpreted as a spectral distribution with n as a non-dimensional frequency. The distribution has a global maximum near N and A sets that value of the $N^{th}$ coefficient at $A^{-2}$. The $(-1)^n$ multiplier makes the series an alternating one, thereby assuring convergence for large values of $N_{max}$. The fundamental frequency is $$\frac{0.5}{T}$$

Figure 6A:
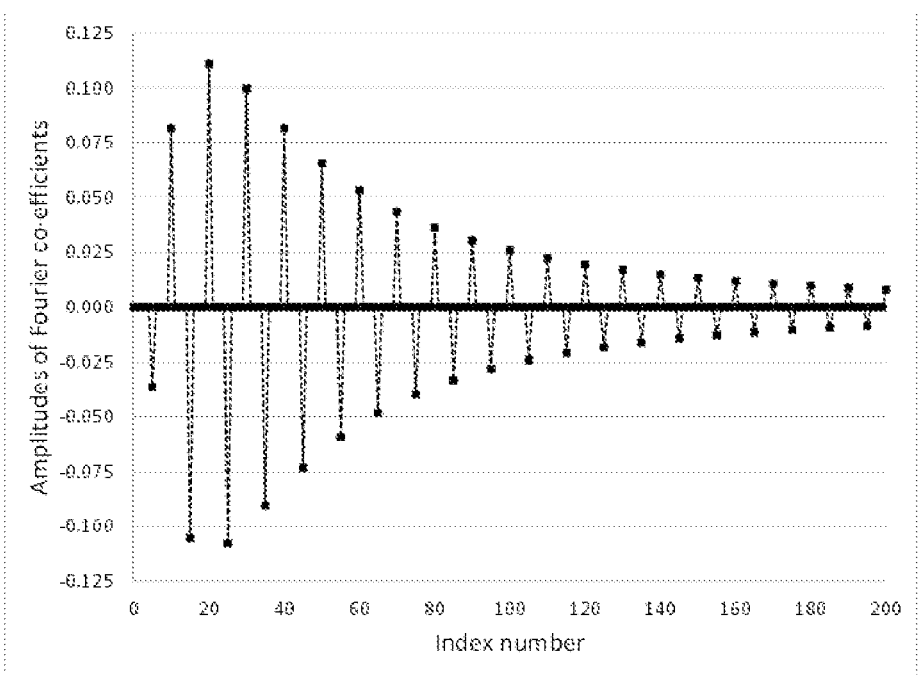
FIGS. 6A, 6B, and 6C depict example plots of amplitudes of coefficients, a time sequence of an acoustic signal, and an associated source strength, respectively.

Hertz, and the contributing tones are 0.5M/T Hertz apart. The relative amplitudes of the coefficients are shown in FIG. 6A.

Figure 6B:
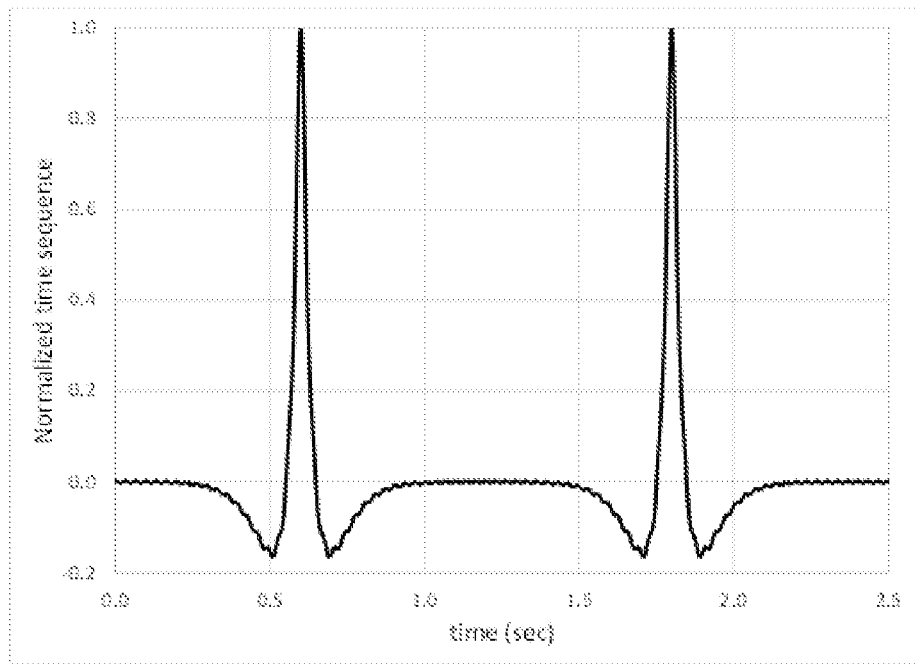

FIG. 6B depicts the time sequence of the acoustic signal. As can be seen, the time sequence has well-defined impulses. Inclusion of sin $$\frac{n\pi j\Delta t}{T}$$

terms permits the generation of more refined sequences.

Figure 6C:
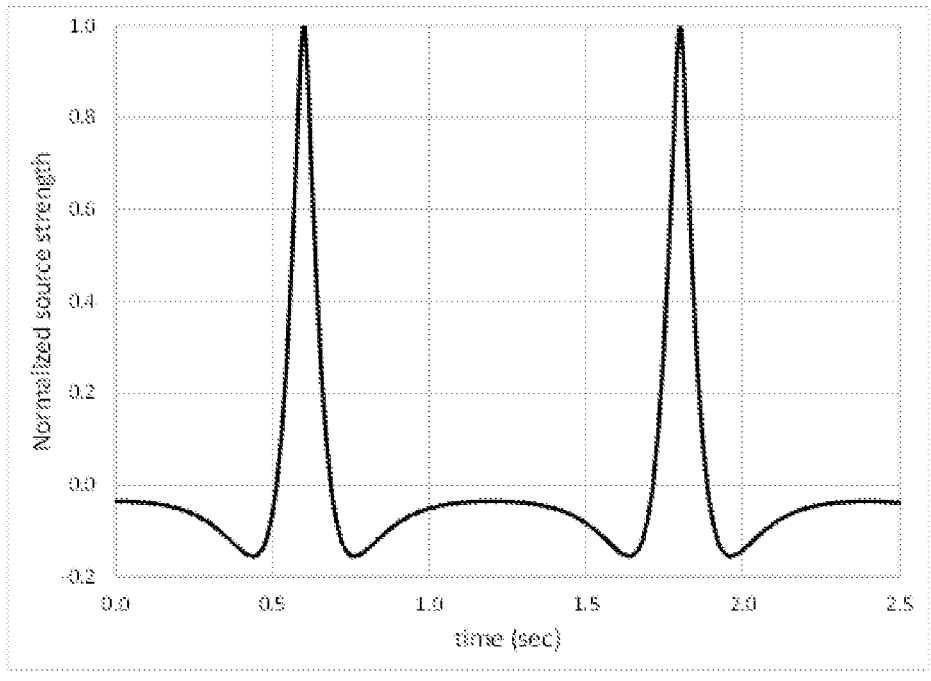

FIG. 6C depicts the associated source strength (i.e., as defined in equation (4)). The time scale of the impulse is greater, while the impulse interval remains unchanged.

Advantageously, the selection of the shape and amplitude of the pulse allows for better analysis of the received signal. In particular, the speed at which unsteady pressures propagate in a fluid-filled pipe with elastic walls is a function of frequency. Some solutions focus on higher order modes where mathematical formalism may be more challenging than for low order modes. In the present system, it is possible to identify propagating modes which are observed with enough sensors 112 to map out the spatial pattern across a cross-section of the pressure vessel 101. More complex mode patterns may employ more sensors 112 to determine the mode pattern. For an average complexity mode pattern, about five sensors 112 may be used. Further the data collected to assess the properties of the wall 102 may be obtained from the fundamental propagating mode (i.e., the water-hammer mode). Thus, as can be appreciated, the above exemplary acoustic signals may be employed during the method 300 of determining properties of the pressure vessel 101 to improve quality of analysis on the collected data.

Returning to FIG. 3, at block 315, the device 104 obtains sensor data from the sensors 112. Specifically, the sensor data represents the acoustic signal emitted at block 310 as received by the sensors 112, after transmission through the pressure vessel 101. The transmission through the pressure vessel 101 may include propagation through various layers of walls (e.g., if the wall 102 comprises multiple layers), insulation, or the like, as well as reflections off the interior of the wall 102 until the sensor 112 is reached.

Figures 4A, 4B:
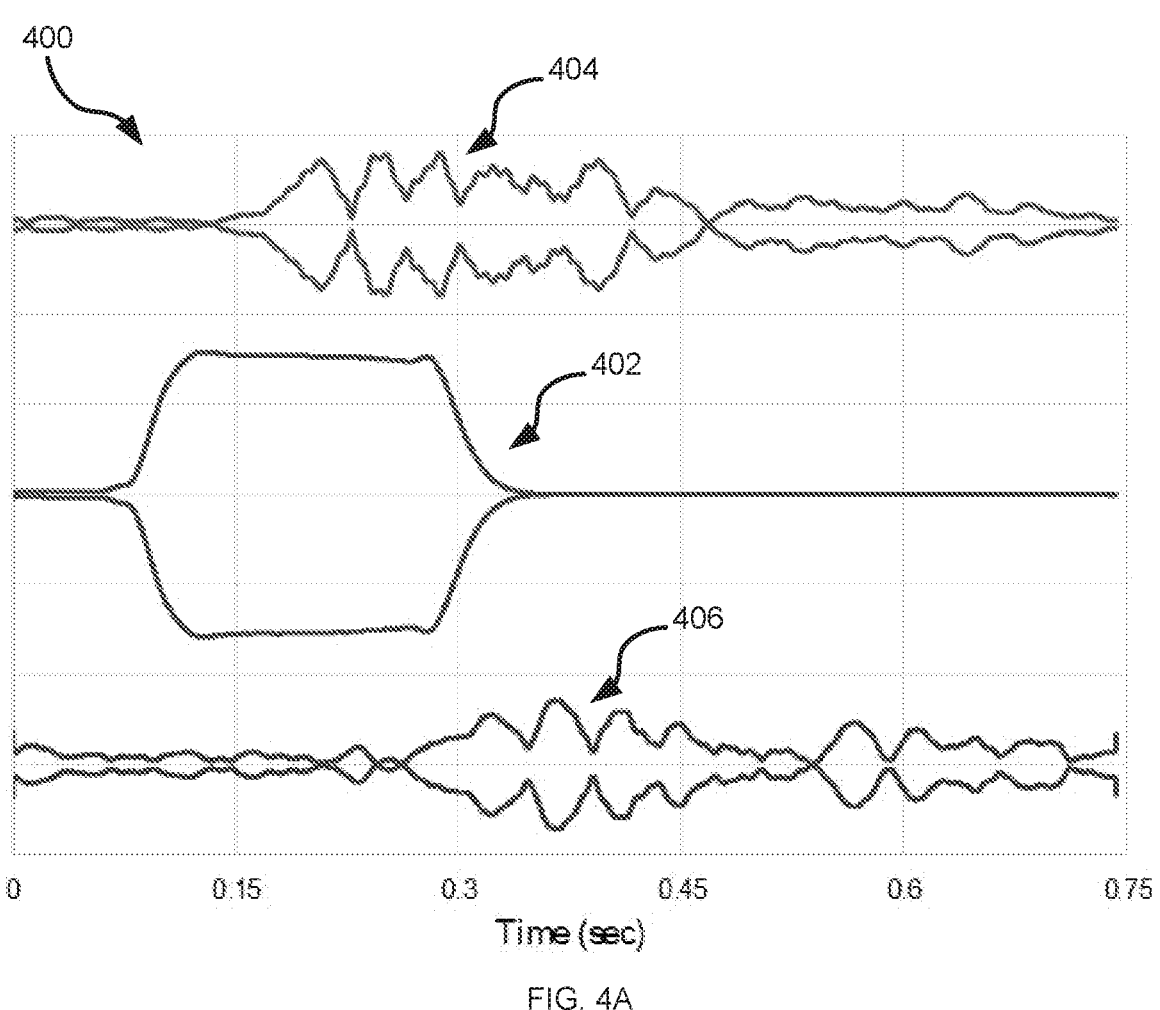
FIGS. 4A and 4B depict example plots of acoustic signals emitted and received at blocks 310 and 315 of the method of FIG. 3.

For example, referring to FIGS. 4A and 4B, an example plots 400 and 410 illustrating, respectively, example envelopes of signals emitted and detected in the system 100, and time travel via cross-correlation. Specifically, envelope 402 represents the signal emitted by the signal generator 108, envelope 404 represents the signal detected by the first sensor 112-1, and envelope 406 represents the signal detected by the second sensor 112-1. The line 412 represents the time travel cross-correlation of the first sensor 112-1, while the line 414 represents the time travel cross-correlation of the second sensor 112-2.

As can be seen, the envelopes 404 and 406 are time-delayed from the signal emitted by the signal generator 108 due to the time to travel from source (i.e., the signal generator 108) to receiver (i.e., the sensors 112). This is particularly clear in view of the peak of the time travel cross-correlation to each of the sensors. Further, the envelopes 404 and 406 include beats generated by reflections at various geometric components of the pressure vessel 101, such as elbows in a pipe.

Returning to FIG. 3, at block 320, the control device 104 determines whether a threshold number of iterations has been reached. The threshold number of iterations may be fixed (e.g., 36, 42, or another number of iterations), or may be dynamically computed, for example based on the quality of the sensor data obtained. For example, if the control device 104 detects too much noise, interference, low amplitude in a threshold portion of the sensor data, the number of iterations may be dynamically increased.

If, at block 320, the threshold number of iterations has not been reached, the control device 104 returns to block 310 to emit a new set of acoustic signals. The signals may be the same signals (e.g., for repetition and consistency) or the control device 104 may control the signal generator to emit different signals (e.g., by changing the shape or frequency of the signals). The control device 104 thus iterates through blocks 310 to emit acoustic signals and block 315 to obtain sensor data corresponding to the acoustic signals until the threshold number of iterations has been reached.

If, at block 320, the threshold number of iterations has been reached, the control device 104 proceeds to block 325. At block 325, the control device 104 computes target properties of the pressure vessel 101. The target properties may be properties of the wall 102, such as wall thickness, as well as locating any faults or cracks in the wall 102. In particular, the target properties are computed based on the sensor data obtained at block 315.

For example, the thickness of the wall may be computed in accordance with equation (6):

$$c_w = \frac{c_0}{\sqrt{1 + \frac{[\rho c_0^2](D + 2\delta)}{(h - \delta - \vartheta)E}}} \tag{6}$$

In particular, in equation (1), $c_w$ represents the speed of sound in the fluid as propagated in the pressure vessel 101, as detected based on propagation from the signal generator 108 to the sensors 112. $\rho$, $c_0$, and E represent the density and the ideal speed of sound of the fluid, and Young's modulus of the wall 102, respectively (i.e., constants). D and h represent the initial diameter and thickness of the wall 102 of the pressure vessel 101 (i.e., as installed), and 8 and V represent the interior and exterior depths of erosion of the wall 102. Thus, based on the acoustic signal emitted from the signal generator 108, the signal received at the sensors 112 and the known parameters (e.g., stored and retrieved from the memory 204) of the pressure vessel 101, the total erosion of the wall may be computed. Further, in some examples, the exterior erosion of the wall may be determined based on visual inspection or other methods, and thus may be used to compute the corresponding interior erosion of the wall 102.

In other examples, where, in addition to the thickness of the wall, there is build up on the interior of the wall, the total thickness, including the thickness of the wall and the material buildup may be computed in accordance with equation (7):

$$N = B\frac{D_p}{\sqrt{\frac{D_pL}{D_h}}} \tag{7}$$

In particular, in equation (2), N represents transmission loss to tuberculation, $D_h$ represents the hydraulic diameter of the passage (i.e., the diameter of the area through which fluid may pass in consideration of material buildup), L represents the length of the segment being evaluated, B represents an experimentally derived absorption coefficient and $D_p$ represents the interior circumference of the pressure vessel. Thus, based on the acoustic signal emitted from the signal generator 108, the signal received at the sensors, and the known parameters of the pressure vessel 101, the material buildup on the interior of the wall may be computed.

Further, the wall thickness is computed by means of two or more parallel computations. For example, the control device 104 may analyze the data received at the first sensor 112-1 to compute a first estimated wall thickness. The control device 104 may further analyze the data received at the second sensor 112-2 to compute a second estimated wall thickness. The first and second estimated wall thicknesses may be compared for consistency. For example, the memory 204 may store a threshold percentage differential allowable between parallel computations of target properties.

In some examples, the fluid contained in the pressure vessel 101 may have gas. Gas is more compressible than liquids, thus, even a small quantity of gas may significantly affect sound propagation. Accordingly, in some examples, prior to computing the wall thickness, the control device 104 may first obtain dissolved gas parameters from the thermo-dilatohydrometer 120 and account for said parameters in computing the wall thickness. Thus, the target properties computed at block 325 may be further based on the dissolved gas parameters obtained from the thermodilatohydrometer 120.

The control device 104 may also use the sensor data to detect faults or cracks in the wall 102. Specifically, the acoustic signals emitted by the signal generator 108 will be radially deflected by faults in the walls, and thus, can be detected by cross-correlating signals received at the sensors 112.

Figure 5A:
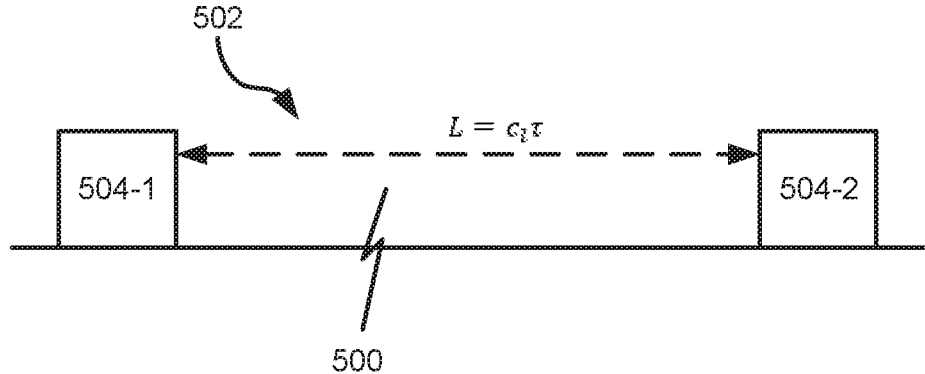
FIGS. 5A and 5B depict a schematic diagram of an example method of detecting a fault at block 325 of the method of FIG. 3.
Figure 5B:
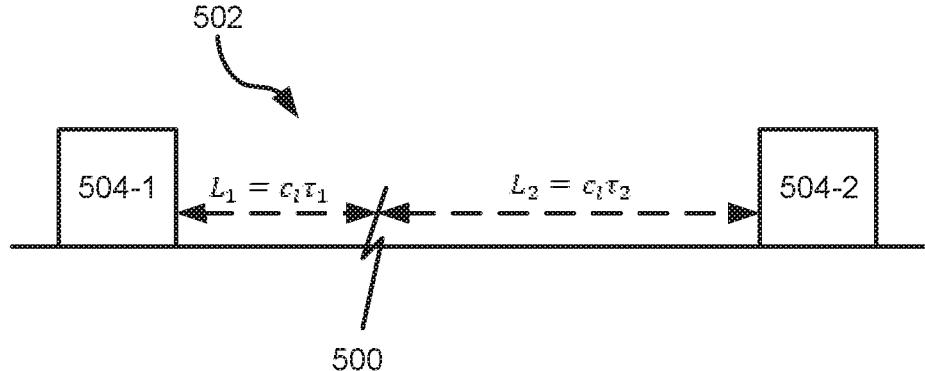

For example, referring to FIGS. 5A and 5B, a schematic diagram of a fault detection computation is depicted. A fault 500 is depicted along a length 502 of a pressure vessel. The fault 500 is located between sensors 504-1 and 504-2. For simplicity, the fault 500 is shown as being directly in line between the sensors 504-1 and 504-2, and hence only distances are only computed in the below example along the axis defined by the sensors 504-1 and 504-2. As will be appreciated by those of skill in the art, such computations are readily translatable to three-dimensional distances based on triangulation of distances to the sensors.

As depicted in 5A, the control device 104 may first determine the time (r) taken for a signal to traverse a known distance (L) between the two sensors 504 to determine a frequency dependent propagation speed ($c_j$). Thus, as shown in FIG. 5B, when the acoustic signal emitted by the signal generator is deflected by the fault 500, it takes a first time ($\tau_1$) to traverse the distance ($L_1$) to the first sensor 504-1 and a second time ($\tau_2$) to traverse the distance ($L_2$) to the second sensor 504-2, and since $L_1+L_2=L$, the control device 104 determines that the source of the deflected signal (i.e., the fault 500) is at $L_1=0.5(c_j(\tau_1-\tau_2)+L)$, where $L_1$ is computed relative to the location of the first sensor 504-1.

At block 330, the control device 104 is to output an indication of the target properties computed at block 325. For example, the control device 104 may tabulate the results and display the target properties on a display screen, send an email notification or generate a report including the target properties, or the like. The control device 104 may further store the target properties, for example in the repository 212 in the memory 204 for future processing.

In some examples, the control device 104 may further compare the computed target properties with threshold conditions. For example, the control device 104 may obtain manufacturing specifications of wall thickness from the memory 204. If the wall thickness computed at block 325 is outside of a threshold similarity (e.g., based on a percentage difference, predefined threshold tolerance or the like) relative to the manufacturing specifications, then the control device 104 may initiate an error condition sequence. For example, the control device 104 may generate one or more alerts, notifications or the like to notify operators of a potential weakness in the pressure vessel. Similarly, if any faults are detected, the control device 104 may generate one or more alerts, notifications or the like to notify operators of the potential leak in the pressure vessel 101.

Further, the control device 104 may compare the computed target properties with previously stored computed target properties. If the presently computed target properties are outside of a threshold similarity (e.g., based on a percentage difference, predefined threshold tolerance or the like) relative to the previously stored target properties, then the control device 104 may flag the presently stored target properties as a potential outlier, and hence may delay initiating an error condition sequence until further data is obtained.

A site experiment conducted in October through December 2019 demonstrated the utility and accuracy of the above-described system on an in-service, insulated hot water pipe. Sensors and two types of sound sources (sonar and shaker) were installed on a length of pipe at the test site. After calibrating the system for background noise and adjusting the gain on the sensors, the sonar was operated for several runs where pulses of different frequency and duration were introduced into the pipe. This was followed by a similar set of tests using the shaker. After the tests were completed, a pipe coupon was cut from the tested section and tested destructively to validate the testing results.

The average computed dimensioning results, manufacturing specifications and pipe coupon results are outlined in Table 1.

TABLE 1

| Site Test Results | | | | |
|---|---|---|---|---|
| | Outer Diameter (mm) | Inner Diameter (mm) | Thickness (mm) | Burst Pressure (MPa) |
| Manufacturer specifications | 508 | 489.0 | 9.525 | 19.00 |
| Sonar result location A | 508 | 489.6 | 9.220 | 18.40 |
| Shaker result location A | 508 | 490.5 | 8.760 | 17.47 |
| Pipe coupon location A | 508 | 489.5 | 9.290 | 17.53 |
| Sonar result location B | 508 | 489.0 | 9.510 | 18.97 |
| Pipe coupon location B | 508 | 489.0 | 9.530 | 19.00 |
| Sonar result location C | 508 | 489.2 | 9.400 | 18.76 |
| Pipe coupon location C | 508 | 489.3 | 9.354 | 17.65 |

Overall, the system demonstrated an accuracy of approximately ±2% to ±5% as compared to destructive testing. Improved accuracy may be achieved using a compatible thermodilatohydrometer to measure dissolved gas and temperature parameters during testing.

A leak or fault was also simulated using a modal hammer in lieu of a leak. Specifically, the taps from the modal hammer simulated the radial deflections caused by a leak or fault in the wall. The modal hammer also provided a precise time reference to allow propagation speeds to be determined.

The leak was accurately detectable to within 0.7 pipe diameters. The results are outlined in Table 2.

TABLE 2

| | Leak Simulation Results | |
| --- | --- | --- |
| | Actual distance from simulated leak (m) | Computed distance from simulated leak (m) |
| Sensor 1 | 13.04 | 13.19 |
| Sensor 2 | 63.91 | 63.74 |
| Sensor 3 | 157.22 | 157.05 |

As described above, a system for non-invasive determination of properties of a pressure vessel is provided. The system includes a signal generate to generate acoustic signals, a plurality of sensors to detect the acoustic signal response as transmitted through the pressure vessel, and a control device. The control device controls the signal generator to introduce the acoustic signals in a controlled deterministic manner, at specific frequencies and durations. The control device further obtains sensor data from the sensors and uses the sensor data to determine the target properties, such as wall thickness and the locations of faults or leaks. The system iterates through various frequencies and performs parallel computations to verify consistency. The present system thus provides accurate and non-invasive determination of properties of the pressure vessel.

The scope of the claims should not be limited by the embodiments set forth in the above examples but should be given the broadest interpretation consistent with the description as a whole.

The invention claimed is:

1. A system for determining target properties of a pressure vessel, the system comprising:

a signal generator acoustically coupled to a fluid contained in the pressure vessel and disposed at an external surface of a wall of the pressure vessel, the signal generator to directly emit acoustic signals into the fluid;

a plurality of sensors acoustically coupled to the fluid and disposed externally to the pressure vessel to detect the acoustic signals;

a gas sensor configured to determine dissolved gas parameters of the fluid contained within the pressure vessel;

a control device interconnected with the signal generator and the plurality of sensors, the control device configured to:

control the signal generator to directly emit acoustic signals into the fluid;

obtain sensor data from the plurality of sensors, the sensor data representing the acoustic signals as received by the plurality of sensors;

obtain the dissolved gas parameters from the gas sensor;

compute, based on the sensor data and the dissolved gas parameters, the target properties of the pressure vessel; and output an indication of the target properties, wherein the target properties comprise one or more of: a thickness of the wall of the pressure vessel, and a location of a fault in the pressure vessel.

2. The system of claim 1, wherein the control device is further to:

obtain predefined parameters of the pressure vessel and the fluid contained therein; and compute the target properties based on the sensor data and the predefined parameters.

3. The system of claim 1, wherein, prior to controlling the signal generator to emit the acoustic signals, the control device is further to calibrate the signal generator and the plurality of sensors.

4. The system of claim 3, wherein, to calibrate the signal generator and the plurality of sensors, the control device is to:

compute initial spectral pulse parameters based on predefined parameters of the pressure vessel and the fluid contained therein;

control the signal generator to emit test signals according to the initial spectral pulse parameters;

obtain test signal data at the plurality of sensors; and adjust a strength of the test signals emitted by the signal generator based on the test signal data and according to a target received signal strength.

5. The system of claim 1, wherein the control device is further to:

determine whether a threshold number of iterations of controlling the signal generator to emit acoustic signals and obtaining sensor data from the sensors has been reached; and compute the target properties only when the determination is affirmative.

6. The system of claim 1, further comprising temperature control components coupled to the signal generator and the sensors to maintain respective operating temperatures of the signal generator and the sensors.

7. The system of claim 1, wherein the signal generator further comprises an integrated reference sensor configured to detect the acoustic signal as emitted by the signal generator.

8. A method for determining target properties of a pressure vessel, the method comprising:

controlling a signal generator to directly emit acoustic signals into a fluid contained in the pressure vessel from an external surface of a wall of the pressure vessel, obtaining sensor data representing the acoustic signals as transmitted through the fluid, the sensor data obtained externally to the pressure vessel;

obtaining dissolved gas parameters of the fluid contained within the pressure vessel;

computing, based on the sensor data and the dissolved gas parameters, the target properties of the pressure vessel; and outputting an indication of the target properties, wherein the target properties comprise one or more of: a thickness of the wall of the pressure vessel, and a location of a fault in the pressure vessel.

9. The method of claim 8, further comprising:

obtaining predefined parameters of the pressure vessel and the fluid contained therein; and computing the target properties based on the sensor data and the predefined parameters.

10. The method of claim 8, further comprising, prior to controlling the signal generator to emit the acoustic signals, calibrating the signal generator and a plurality of sensors configured to obtain the sensor data.

11. The method of claim 10, wherein calibrating the signal generator and the plurality of sensors comprises:

computing initial spectral pulse parameters based on predefined parameters of the pressure vessel and the fluid contained therein;

controlling the signal generator to emit test signals according to the initial spectral pulse parameters;

obtaining test signal data from the plurality of sensors; and adjusting a strength of the test signals emitted by the signal generator based on the test signal data and according to a target received signal strength.

12. The method of claim 8, further comprising:

determining whether a threshold number of iterations of controlling the signal generator to emit acoustic signals and obtaining sensor data has been reached; and computing the target properties only when the determination is affirmative.

\* \* \* \* \*